United States Patent
Zimmerer et al.

(10) Patent No.: US 9,095,009 B2
(45) Date of Patent: Jul. 28, 2015

(54) APPARATUS AND METHOD FOR THE CONTROLLED HEATING OF PLASTIC RECEPTACLES

(75) Inventors: Johann Zimmerer, Bernhardswald (DE); Guenter Winkler, Zell (DE); Rainer Englbrecht, Kelheim (DE); Andreas Apelsmeier, Pollenfeld (DE); Konrad Senn, Regensburg (DE)

(73) Assignee: KRONES AG, Neutraubling (DE)

( * ) Notice: Subject to any disclaimer, the term of this patent is extended or adjusted under 35 U.S.C. 154(b) by 454 days.

(21) Appl. No.: 12/993,093

(22) PCT Filed: Apr. 30, 2009

(86) PCT No.: PCT/EP2009/055272
§ 371 (c)(1),
(2), (4) Date: Nov. 16, 2010

(87) PCT Pub. No.: WO2009/141216
PCT Pub. Date: Nov. 26, 2009

(65) Prior Publication Data
US 2011/0084064 A1 Apr. 14, 2011

(30) Foreign Application Priority Data
May 17, 2008 (DE) .......... 10 2008 024 108

(51) Int. Cl.
| H05B 6/64 | (2006.01) |
| --- | --- |
| H05B 6/72 | (2006.01) |
| H01J 37/32 | (2006.01) |
| H05B 6/68 | (2006.01) |
| B29C 49/64 | (2006.01) |
| B29C 49/78 | (2006.01) |
| H05B 6/78 | (2006.01) |
| B29C 49/06 | (2006.01) |
| B29C 35/08 | (2006.01) |

(52) U.S. Cl.
CPC .............. *H05B 6/68* (2013.01); *B29C 49/6418* (2013.01); *B29C 49/78* (2013.01); *H05B 6/78* (2013.01); *B29C 49/06* (2013.01); *B29C 2035/0855* (2013.01)

(58) Field of Classification Search
CPC .... B29C 49/6418; B29C 49/78; B29C 49/06; B29C 2035/0855; H05B 6/78; H05B 6/68
USPC ......... 219/678, 679, 761, 698, 700, 690, 694, 219/695, 696, 702; 369/53.21; 53/425, 167; 264/328.1, 478, 521, 255; 426/238, 426/246; 156/345; 118/723 MW, 723 ME; 315/111.21
See application file for complete search history.

(56) References Cited

U.S. PATENT DOCUMENTS 3,830,893 A * 8/1974 Steingiser ..................... 264/489
5,892,208 A    4/1999 Harris et al.

(Continued)

FOREIGN PATENT DOCUMENTS

| WO | 2006/105769 A1 | 10/2006 |
| --- | --- | --- |
| WO | 2006105769 | 10/2006 |
| WO | 2007/131701 A2 | 11/2007 |
| WO | 2007131701 | 11/2007 |

OTHER PUBLICATIONS

Office Action dated Nov. 5, 2012 issued in Chinese Patent Application No. 2009801183651.

(Continued)

*Primary Examiner* — Quang Van
(74) *Attorney, Agent, or Firm* — Onello & Mello, LLP

(57) ABSTRACT

An apparatus for heating plastic receptacles and particularly plastic parisons may include a transport device, which transports the plastic receptacles along a predetermined transport path, a microwave generation device, and a routing device, which routes the microwaves in the direction of the plastic receptacles which are to be heated The routing device may be at least sectionally in the form of a hollow conductor. The apparatus includes a control device which is in a form such that it controls the microwave energy hitting the plastic receptacles during the heating process.

15 Claims, 2 Drawing Sheets

(56) References Cited

U.S. PATENT DOCUMENTS

| | | | |
|---|---|---|---|
| 6,080,270 A * | 6/2000 | Tabrez et al. | 156/345.36 |
| 2005/0199121 A1 * | 9/2005 | Crnko et al. | 95/87 |
| 2007/0068939 A1 * | 3/2007 | Harris | 219/761 |
| 2010/0052224 A1 | 3/2010 | Humele et al. | |

OTHER PUBLICATIONS

International Search Report dated Jul. 24, 2009 issued in International Application No. PCT/EP2009/055272.

* cited by examiner

APPARATUS AND METHOD FOR THE CONTROLLED HEATING OF PLASTIC RECEPTACLES

CROSS-REFERENCE TO RELATED APPLICATION

This application is filed under 35 U.S.C. 371 as a U.S. national phase application of PCT/EP2009/055272, having an international filing date of Apr. 30, 2009, which claims the benefit of German Patent Application No. 10 2008 024 108.3, having a filing date of May 17, 2008, both of which are hereby incorporated by reference.

TECHNICAL FIELD

The present invention relates to an apparatus and a method of heating plastics-material containers and, in particular, plastics-material pre-forms.

BACKGROUND

In the field of the beverage-producing industry, there is an increasing tendency to use plastics-material containers and PET containers instead of glass bottles. In the manufacture of these containers plastics-material pre-forms are first made available, they are heated and are supplied to an expansion process, so as to obtain the finished plastics-material containers in this way. In this case it is customary in the prior art to let the plastics-material pre-forms run through a heating path inside which they are usually heated with infrared radiation.

In addition, however, it is also known in the prior art to use microwave radiation in order to heat the plastics-material pre-forms. In this case the microwave radiation is produced with a microwave-producing device, such as a magnetron, and is then transmitted by way of a conducting device such as a waveguide to the plastics-material pre-forms to be heated. The microwave energy reaching the pre-forms can be controlled in this case by means of tuning units. The force applied to the plastics-material pre-forms is usually set before the apparatus is put into operation and the apparatus is then operated with this fixed force.

In this case, however, the problem arises that the microwave energy applied to the plastics-material pre-forms can also depend upon the nature of the pre-forms themselves and in this way an equal application of energy into the individual pre-forms or an equal heating is not always guaranteed.

It may be desirable to provide an apparatus and a method which permit a uniform input of energy and a uniform heating of the forms.

SUMMARY

An apparatus according to the invention for the heating of plastics-material containers and, in particular, of plastics-material pre-forms has a conveying device which conveys the plastics-material containers along a pre-determined conveying path. In addition, a microwave-producing device is provided, as well as a conducting device which transmits the microwaves in the direction of the plastics-material containers to be heated, this conducting device being designed at least in part in the form of a waveguide. According to the invention the apparatus has a control device which is designed in such a way that it controls the microwave energy reaching the containers during the heating procedure.

The conveying device can be for example conveyor wheels, conveyor chains or the like. The pre-forms to be heated are conveyed on conveyor wheels of this type along a substantially circular track.

The apparatus according to the invention can also, however, be used for heating containers of other materials, such as in particular for heating glass bottles.

The microwave-producing device is, in particular but not exclusively, a magnetron, in which case the microwave energy produced by the magnetron or the microwaves respectively is or are supplied to the containers by way of the conducting device designed in part in the form of a waveguide.

Whereas in the prior art the force acting upon the containers is usually set before the beginning of operation, the apparatus according to the invention allows the microwave energy reaching the containers to be controlled or regulated during the heating process. In this way it is possible to react rapidly and flexibly to different physical conditions such as for example different degrees of absorption of different pre-forms. In this case a control of the microwave energy is understood to mean that, in particular, a variation in the microwave energy is also possible during the heating procedure of individual pre-forms.

In an advantageous embodiment the apparatus has an energy-adjustment unit which is arranged in a region of the conducting device and which influences the microwave energy reaching the plastics-material containers. This is, in particular, tuning elements which vary the microwave energy reaching the microwaves.

It is preferable for the microwave energy reaching the plastics-material containers to be altered by the energy-adjustment unit. It would also be possible, however, for the microwave energy reaching the plastics-material containers to be altered by magnitudes of the movement of the plastics-material containers being altered with respect to the apparatus and, in particular, with respect to a resonator of the microwave-producing device. In this way, the input of energy into the plastics-material containers can be reduced for example by an increase in the speed of movement of the containers with respect to the resonator.

In addition, the steps specified above for altering the microwave energy reaching the plastics-material containers could be combined with one another.

In the case of a preferred embodiment the energy-adjustment unit has at least one regulating member which projects into the conducting device and the position of which is capable of being altered with respect to the internal cross-section of the conducting device for the power adjustment. In this case it is preferable for it to be a tuning pin or the like which projects into the waveguide and the projection of which can be altered. The further this tuning pin projects into the waveguide, the more the microwave energy reaching the plastics-material pre-forms is diminished.

In the case of a further advantageous embodiment the regulating member is movable with respect to the conducting device with the aid of a linear motor. In the prior art, stepping motors are generally used for moving this regulating member or tuning pin. By using linear motors a substantially more rapid movement of the regulating member is possible, so that, in particular, even during the heating procedure a rapid subsequent displacement of the regulating member and thus a rapid regulation of the force reaching the pre-forms can be carried out.

In the case of a further advantageous embodiment the apparatus has a resonator for heating the plastics-material containers. This is preferably a resonator, into the interior of which the pre-form to be heated is introduced and inside which it is then heated by being acted upon with the microwave energy.

In the case of a further advantageous embodiment the apparatus has a sensor device which measures microwave transmission returning from the plastics-material containers. With this advantageous embodiment it is proposed that the sensor device should not measure the force which reaches the plastics-material containers, but measures the force which is reflected by or returns from the plastics-material pre-forms. In this way, conclusions can be directly drawn on the absorption of the microwave energy by the plastics-material containers. The heating procedure can be controlled or regulated on the basis of the force detected by this sensor device.

It is preferable both for a sensor device, which determines the force reaching the plastics-material pre-forms, and for a sensor device, which determines the microwave energy returning from the plastics-material pre-forms, to be provided.

In the case of a further advantageous embodiment the control device is a regulating device which, in a manner dependent upon microwave energy returning from the plastics-material containers, regulates the microwave energy reaching the plastics-material containers. In particular, in this case the control device regulates the microwave energy in a manner dependent upon an output signal of the sensor device. In this way, even during a current heating procedure of a container the microwave energy reaching each container can be altered individually for it.

It is preferable for the regulating device to have the effect that the position of the regulating member of the energy-adjustment unit is altered with respect to the conducting device. In this embodiment a signal, by means of which the position of the regulating member is altered and is thus acted upon directly on the microwave energy reaching the plastics-material pre-forms, is transmitted by the regulating device to the linear motor or the drive for the regulating member. In this way it is proposed that the microwave energy reaching the pre-forms should be adapted, preferably in a permanent manner, during the heating by means of a closed regulating circuit.

In the case of a further advantageous embodiment the energy-adjustment unit has a plurality of regulating members, the position of which with respect to the conducting device is capable of being altered.

It is preferable for the energy-adjustment unit to have a plurality of regulating members, the position of which with respect to the conducting device is capable of being altered. In this case, however, it is preferable for only one regulating member of this type to be actuated by the regulating device, or for the position thereof to be regulated during the heating procedure of the containers. The further regulating member or members is or are set before the beginning of operation and the position thereof is preferably retained in the further operation.

It is preferable for the apparatus to have a temperature-detection device which establishes a temperature of the plastics-material containers during the heating thereof. In this case it is preferable for it to be a temperature-detection device which detects the temperature without contact, for example a pyrometer.

The present invention further relates to a method of heating plastics-material containers and, in particular, plastics-material pre-forms, the plastics-material containers being conveyed along a pre-determined path by means of a conveying device and being heated by means of microwaves, and these microwaves being produced by a microwave-producing device and being transmitted to the plastics-material containers by a conducting device. It is preferable for these microwaves to be transmitted at least in part inside a waveguide.

According to the invention the control device controls the microwave energy reaching the plastics-material containers during the heating procedure of the plastics-material containers. In this case, in contrast to the prior art, the microwave energy is not kept constant during the heating procedure, but can be adapted in a flexible manner to different physical conditions.

It is preferable for the microwave energy to be altered at least once during the heating procedure. If for example it is established that a relatively high proportion of microwave energy is not adsorbed by the plastics-material pre-forms and thus does not contribute to the heating thereof, the microwave energy can be increased accordingly.

It is preferable for the microwave energy reaching the plastics-material containers to be regulated in a manner dependent upon the microwave energy returning from the plastics-material containers. In addition, it is also possible for the microwave energy reaching the plastics-material containers to be controlled or regulated in a manner dependent upon a temperature of the plastics-material containers during the heating procedure, it being preferable for this temperature to be detected without contact, for example by means of a pyrometer.

In the case of a further preferred method the microwave energy reaching the containers is altered with the aid of an energy-adjustment unit, this energy-adjustment unit having at least one regulating member which projects into the conducting device and the position of this regulating member with respect to the conducting device being altered in order to alter the microwave energy. In this case for example the regulating members can be withdrawn further out of the conducting device as a reaction to excessively low power consumption by the plastics-material containers, in order to increase in this way the energy to be applied to the plastics-material pre-forms.

In the case of a further preferred method the energy-adjustment unit has a plurality of regulating members, but only the position of some of the regulating members, and in a particularly preferred manner only precisely one regulating member with respect to the conducting device is altered during the heating of the plastics-material containers. In this way a very rapid and flexible reaction of the apparatus is possible. In particular, it is not necessary for a multiplicity of method steps which possibly have interacting effects to be carried out during the regulation.

In the case of a further preferred method the position of the regulating member with respect to the conducting device is regulated in a manner dependent upon microwave energy returning from the plastics-material containers. In this case it is proposed in terms of the method that the microwave energy should be regulated by a closed regulating circuit.

Further advantages and embodiments of the invention may be seen in the accompanying drawings.

DETAILED DESCRIPTION

Figure 1:
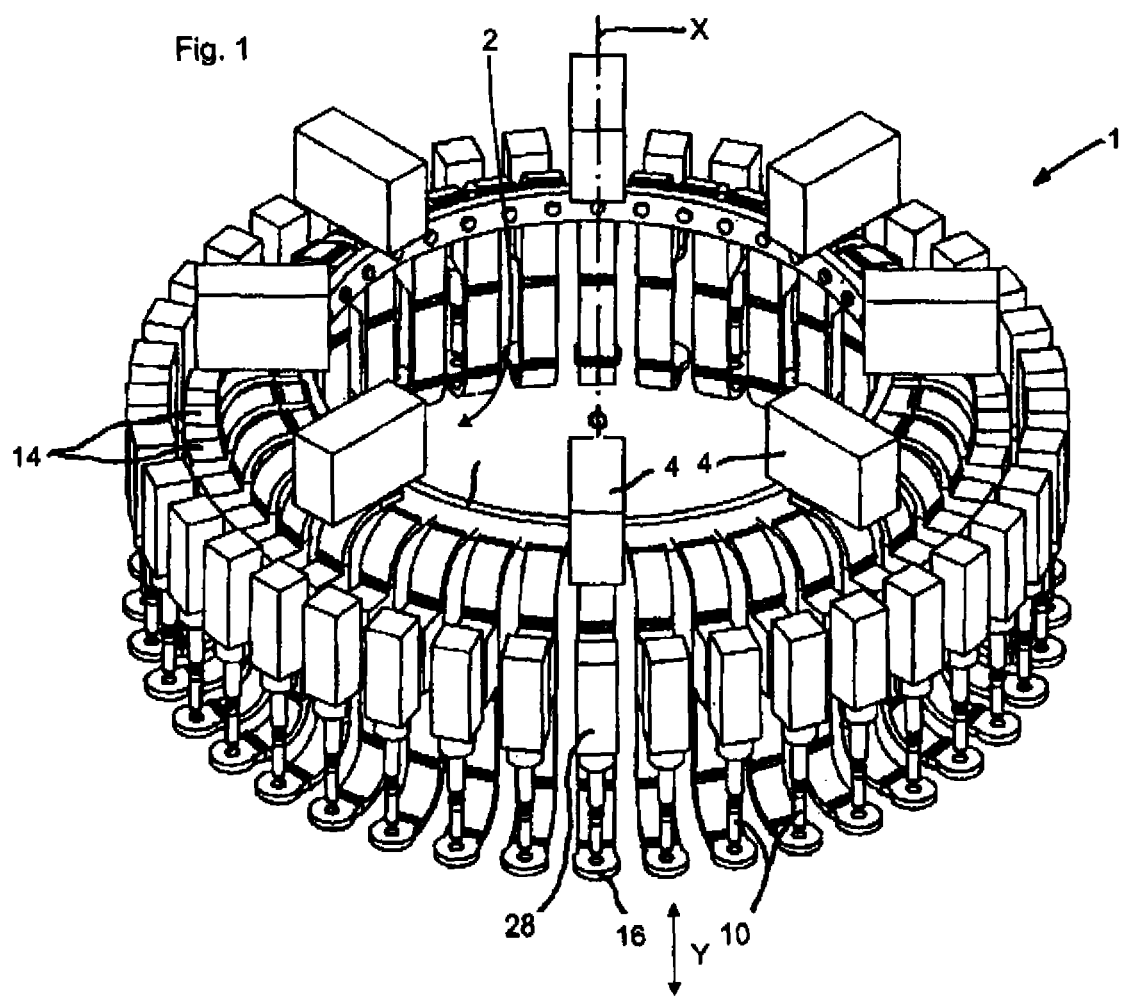
FIG. 1 is a diagrammatic illustration of an apparatus for heating containers.

FIG. 1 shows an apparatus 1 for heating containers 10. In this case the apparatus 1 has a plurality of microwave-producing devices 4, the microwaves produced by these microwave-producing devices 4 reaching resonators 16 by way of conducting devices and being inserted from these resonators 16 into containers 10 which are pre-forms in this case. The apparatus can also, however, be used for heating plastics-material containers which have already been finished.

In this case the reference number 2 designates a conveying device which has the effect that the individual containers are rotated about an axis of rotation X. The reference numeral 14 designates in its entirety energy-adjustment units which regulate the energy applied to the containers. The position of the containers 10 with respect to the resonators 16 in the direction Y, which extends parallel to the axis of rotation X, can be shifted with the aid of driving devices 28.

Figure 2:
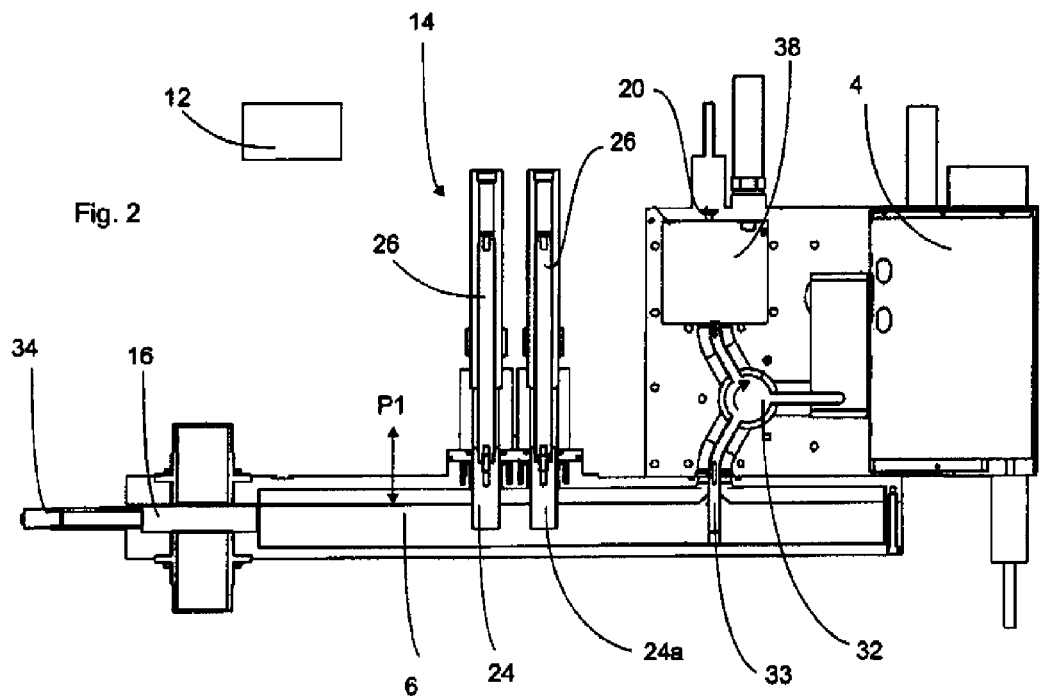
FIG. 2 is a diagrammatic illustration of an apparatus according to the invention in a first embodiment.

FIG. 2 shows an apparatus 1 according to the invention in a first embodiment. This apparatus has a magnetron 4, into which a heating device (not shown) is already incorporated. The microwaves are produced in this magnetron 4 and are transmitted in a circulator 32.

Starting from this circulator the microwaves are introduced into a conducting device 6 in the form of a microwave wave guide or rectangular wave guide with the aid of a coupling device 33. From there the microwaves arrive in a resonator 16 or the containers 10 (not shown) arranged inside this resonator. In this case the containers are pressed into the resonator 16 in the direction of the arrow P1.

The reference number 34 designates a pyrometer which is arranged on the resonator and measures the temperature of the pre-forms without contact. The microwaves returning from the containers pass in turn into the circulator and from there into a water load 38. This water load 38 is used for damping the microwaves. The returning microwave energy can be measured with the aid of a sensor device 20 in the form of a diode. The measured values are in turn recorded by a control device 12 and are used for adjusting the power. It would also be possible, however, to use the values emitted by the pyrometer 34, in addition to or instead of the values measured by the sensor device, for adjusting the power or energy. In addition, the pyrometer could also be used for altering the heating phase.

The reference number 14 designates in its entirety an energy-adjustment unit which in this case has two drives 26 in the form of linear motors. In addition, the energy-adjustment unit 14 has two regulating members or tuning pins 24, 24a, the position of which can be altered with respect to the waveguide 6 in the direction of the arrow P1. When necessary, during the current operation, i.e. the current heating of the containers, the control device 12 alters the position of the regulating member 24 with respect to the rectangular wave guide and thus regulates the microwave energy applied to the container. In the case of apparatus known from the prior art, at least three regulating members are provided in part. In the case of the embodiments proposed here, however, even two regulating members of this type are sufficient.

Figure 3:
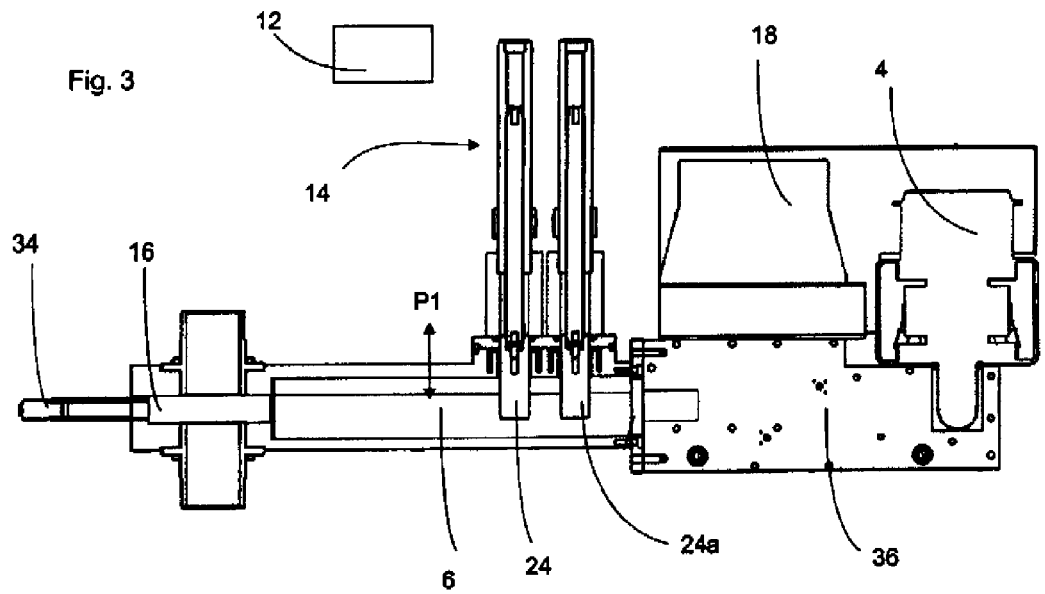
FIG. 3 is a diagrammatic illustration of an apparatus according to the invention in a second embodiment.

FIG. 3 shows an apparatus according to the invention in a further embodiment. In this embodiment a magnetron 4 is likewise provided, and a heating device 18 but which is separate from it. The reference number 36 designates in this case a rectangular wave guide with an integrated circulator and a water load, likewise integrated. The coupling is carried out in this case into the rectangular wave guide 6 by a rectangular wave guide 36. In this case too, the reference number 14 again designates the energy-adjustment device which is controlled by the control device 12. The provision of linear motors 26 permits a dynamic or rapid travel of the regulating members and thus also the regulation of the power in the current operation. The power which is reflected by the containers and which is a measure of the microwave energy absorbed by the containers is used as a regulating parameter. It is preferred, as mentioned above, for only the position of the left-hand regulating member 24 to be regulated and for the position of the right-hand regulating member 24a to be merely controlled, for example set at the beginning of an operating process. The position of that regulating member which is closer to the containers 10 to be heated is preferably always regulated. It is preferable for the local position of the regulating member to be displaceable in the longitudinal direction thereof.

All the features disclosed in the application documents are claimed as being essential to the invention, insofar as they are novel either individually or in combination as compared with the prior art.

What is claimed is:

1. An apparatus for the heating of plastics-material containers comprises:
    a conveying device, which conveys the plastics-material containers along a pre-determined conveying path;
    a microwave-producing device configured to produce microwaves;
    a conducting device, which transmits the microwaves in the direction of the plastics-material containers to be heated, said conducting device being designed at least in part in the form of a waveguide;
    a control device, which is designed in such a way that it controls the energy of the microwaves produced by the microwave-producing device that reaches the plastics-material containers during the heating procedure, wherein the control device is a regulating device which, in a manner dependent upon substantially only microwave energy returning from the plastics-material containers, regulates the substantially only microwave energy reaching the plastics-material containers; and
    an energy-adjustment unit, which is arranged in a region of the conducting device and which influences the microwave energy reaching the plastics-material containers, wherein the energy-adjustment unit includes at least one regulating member, which projects into the conducting device and the position of which is capable of being altered with respect to the conducting device,
    wherein a signal, by means of which the position of the regulating member is altered and is thus acted upon on the microwave energy reaching the plastics-material containers, is transmitted by the regulating device to the drive for the regulating member, and wherein the microwave energy reaching the plastics-material containers is adapted, in a permanent manner, during the heating by means of a closed regulating circuit enabled by the control device.

2. An apparatus according to claim 1, wherein the regulating member is movable with respect to the conducting device with the aid of a linear motor.

3. An apparatus according to claim 1, further comprising a resonator for heating the plastics-material containers.

4. An apparatus according to claim 1, further comprising a sensor device, which measures microwave energy returning from the plastics-material containers.

5. An apparatus according to claim 1, wherein the regulating device has the effect that the position of a regulating member of the energy-adjustment unit is altered with respect to the conducting device.

6. An apparatus according to claim 1, wherein the energy-adjustment unit has a plurality of regulating members, the position of said regulating members with respect to the power device being alterable.

7. The apparatus according to claim 1, wherein the energy-adjustment unit has two regulating member, the position of the regulating members being alterable in a direction substantially perpendicular relative to the wave guide, the two regulating members being tuning pins.

8. The apparatus according to claim 7, further comprising linear motors configured to permit dynamic or rapid travel of the regulating members, thereby regulating power in the heating procedure.

9. A method of heating plastics-material containers, comprising:
conveying the plastics-material containers along a pre-determined path by means of a conveying device;
heating the plastics-material containers by means of microwaves which are produced by a microwave-producing device and are transmitted to the plastics-material containers by a conducting device;
controlling the energy of the microwaves produced by the microwave-producing device that reaches the plastics-material containers during the heating procedure of the plastics-material containers by a control device,
wherein the control device is a regulating device which, in a manner dependent upon substantially only microwave energy returning from the plastics-material containers, regulates the substantially only microwave energy reaching the plastics-material containers; and
altering the microwave energy reaching the containers with the aid of an energy-adjustment unit, wherein this energy-adjustment unit has at least one regulating member which projects into the conducting device, and wherein the position of this regulating member with respect to the conducting device is altered in order to alter the microwave energy,
wherein a signal, by means of which the position of the regulating member is altered and is thus acted upon on the microwave energy reaching the plastics-material containers, is transmitted by the regulating device to the drive for the regulating member, and wherein the microwave energy reaching the plastics-material containers is adapted, in a permanent manner, during the heating by means of a closed regulating circuit enabled by the control device.

10. A method according to claim 9, further comprising altering the microwave energy at least once during the heating procedure.

11. A method according to claim 9, further comprising regulating the microwave energy reaching the plastics-material containers in a manner dependent upon the microwave energy returning from the plastics-material containers.

12. A method according to claim 9, wherein the energy-adjustment unit has a plurality of regulating members, but only the position of precisely one regulating member with respect to the conducting device is altered during the heating of the plastics-material containers.

13. A method according to claim 9, wherein the position of the regulating member with respect to the conducting device is regulated in a manner dependent upon microwave energy returning from the plastics-material containers.

14. An apparatus for the heating of plastics-material containers comprises:
a conveying device, which conveys the plastics-material containers along a pre-determined conveying path;
a microwave-producing device configured to produce microwaves;
a conducting device, which transmits the microwaves in the direction of the plastics-material containers to be heated, said conducting device being designed at least in part in the form of a waveguide; and
a control device, which is designed in such a way that it controls the energy of the microwaves produced by the microwave-producing device that reaches the plastics-material containers during the heating procedure, wherein the control device is a regulating device which, in a manner dependent upon substantially only microwave energy returning from the plastics-material containers, regulates the substantially only microwave energy reaching the plastics-material containers, wherein the microwave energy reaching the plastics-material containers is altered by magnitudes of the movement of the plastics-material containers being altered with respect to a resonator of the microwave-producing device,
wherein the input of energy into the plastics-material containers is adjusted by an increase or decrease in the speed of movement of the plastics-material containers with respect to the resonator.

15. The apparatus according to claim 14, wherein the microwave energy reaching the plastics material container is adapted permanently, during the heating.

* * * * *